Sept. 19, 1944.   H. A. FLOGAUS   2,358,699
VEHICLE SPRING
Filed July 21, 1942
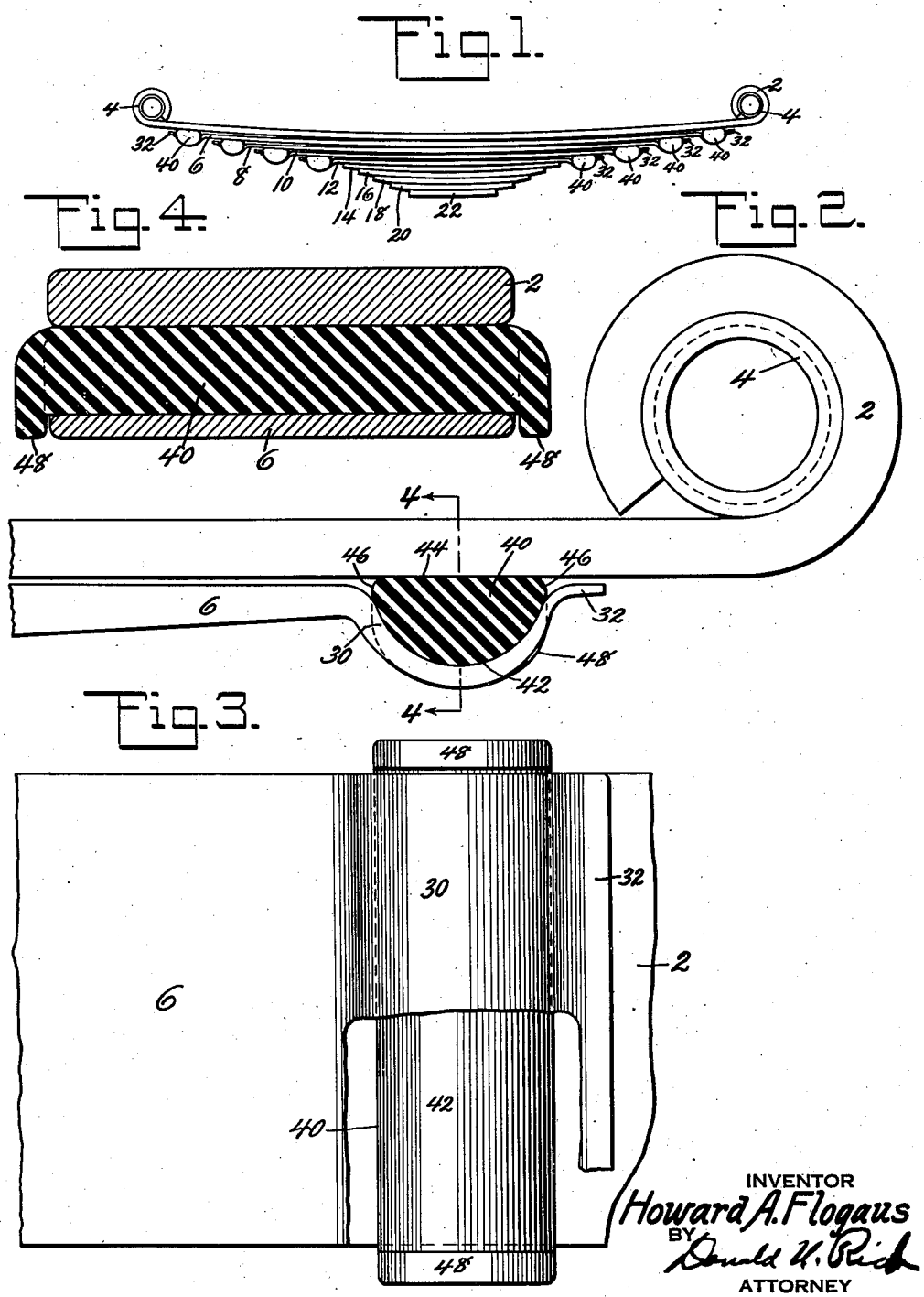

Patented Sept. 19, 1944

2,358,699

UNITED STATES PATENT OFFICE 2,358,699

VEHICLE SPRING

Howard A. Flogaus, Media, Pa., assignor to The J. G. Brill Company, Philadelphia, Pa., a corporation of Pennsylvania Application July 21, 1942, Serial No. 451,697

5 Claims. (Cl. 267—50)

This invention relates to springs in general and in particular to leaf springs intended for use on vehicles running on either road or rail.

Numerous attempts have been made in the past to provide a completely satisfactory leaf spring but such attempts have failed to a greater or lesser degree. Any spring which is designed to be unlubricated, that is, have the leaves in direct metallic contact, is noisy and changes its characteristics as the metal becomes scored. On the other hand if a spring is designed for lubrication it soon becomes too stiff due to loss of lubricant and its ride characteristics are very bad. It is well known that it is practically impossible to maintain lubricant in vehicle springs due to the squeezing action of the spring leaves and due to the high velocity jets of water driven by the wheels against the springs. Attempts have been made to lubricate springs by inserts but these inserts could of necessity occupy but a small part of the spring leaf end since they could not carry the load. Attempts have also been made to insulate the leaves of springs with flat pads having no lubricating function but such pads rapidly disintegrated due to the wedging action of the springs in service and due to the heavy loads, the point of application of which varied as the load on the spring varied. It is an object, therefore, of the present invention to provide a lubricating, insulating pad of sufficient strength to support the entire load transmitted from one spring leaf to the other.

A further object of the invention is the provision of a lubricating and insulating pad which can be readily inserted or removed from between the spring leaf ends.

A still further object of the invention is the provision of a lubricating pad carried by the spring leaf ends and which is self-equalizing to absorb the complete load over its entire area at all times.

A yet further object of the invention is the provision of an insert between spring leaves at the tips which will accomplish control over the spring friction thereby maintaining the ride characteristics of the spring substantially uniform.

These and other objects of the invention will be apparent to persons skilled in the art from a study of the following description and accompanying drawing, in which:

Figure 1 is an elevational view of a spring having the improvements applied thereto;

Fig. 2 is an enlarged detail view of an end of a spring with the improvement applied thereto;

Fig. 3 is an inverted plan view of a portion of the spring with parts broken away to better disclose the lubricating and insulating means, and Fig. 4 is a sectional view taken substantially on line 4—4 of Fig. 2.

Referring now to the drawing in detail, it will be seen that the spring as shown in Fig. 1 is built up of a plurality of varying length leaves, the topmost of which has its ends rolled as at 2 around a bushing 4 thus forming an eye adapted to receive a pin, shackle or other means, by means of which the spring is attached to and supports the vehicle. The remainder of the spring unit is made up of a plurality of decreasing length leaves numbered 6, 8, 10, 12, 14, 16, 18, 20 and 22, respectively, from the top toward the bottom. Of these varying length leaves those numbered 14 to 22 inclusive are of more or less standard construction, while those numbered from 6 to 12 inclusive are modified to accommodate the improvement later to be described. It will, of course, be obvious that the improvement may be applied to more or less spring leaves than has been illustrated in Fig. 1.

Each of the spring leaves 6, 8, 10, 12 have their ends deformed by curving the metal outwardly and inwardly to provide a semi-cylindrical shape pocket 30. The metal forming the outer edge of this pocket or tip of the spring is bent outwardly as at 32 substantially parallel with the main portion of the spring. In this manner a strong semi-cylindrical pocket is formed extending completely across the spring unpierced by any holes and leaving the spring unweakened since there has been no stretching or extreme deformation of the metal forming the spring. This feature is important since the entire load carried by a spring is transmitted through the tip of the spring.

In order to separate the spring leaves 2 to 12 inclusive special insert units 40 are used. Each of these inserts is moulded or formed with a semi-cylindrical back portion 42 exactly conforming to the semi-cylindrical pocket 30 in the spring leaves. The face portion 44 is made substantially flat and adapted to engage the opposing surface of the adjacent spring. For ease in moulding or forming and to prevent abrasion, the corners adjoining the face and back are rounded as at 46. In this manner a semi-cylindrical bearing pad with wide engaging face, curved back and rounded corners is provided. This bearing pad, as clearly shown, particularly in Fig. 4, is provided with end flanges 48 extending outwardly from the back portion at the ends of the member and spaced sufficiently far apart to receive the spring leaf therebetween.

In this manner the bearing unit is held against transverse shifting relative to the semi-cylindrical spring tip pocket. Each of the units is formed of sufficient thickness to hold the spring leaves apart slightly, and it has been found that a space of $\frac{1}{16}$ of an inch is sufficient to give a proper spring action for a long period of time. The units or inserts may be made of any suitable material but in practice it has been found that if they are made of dense layers of fabric bound together with a binder impregnated with graphite the best results are obtained. Graphite impregnated metal, rubber or other material could be used but in any case the insert is of sufficient strength as to carry the entire load while lubricating the entire bearing area subject to friction.

It will be seen that the bearing unit or insert may be readily inserted by merely prying the spring leaves apart sufficient to permit passage of the flanges 48, after which the unit may be slid transversely of the spring leaf until the flanges 48 drop over the sides of the semi-cylindrical pocket formed in the spring end. Removal of the wedging means will then permit the spring leaf to grip the insert and force the face 44 against the adjacent spring leaf. The flanges 48 will prevent any transverse shifting of the unit, while the semi-cylindrical pocket prevents removal of the unit along the spring. Due to the semi-cylindrical pocket and back of the bearing pad or insert, the pad or insert may adjust itself to various angular relations between the spring leaves such as arise when the spring is subjected to bearing loads, thus the entire bearing face 44 will be equally loaded and always in contact with the adjacent spring leaf and will slide on such leaf as a flat shoe. The graphite or other material in the unit will lubricate the steel surface, thereby preventing any squeaks, while the non-metallic composition of the unit will either eliminate or dampen transmission of noise from any cause through the spring to the vehicle body.

While the invention has been described more or less in detail, it will be obvious to persons skilled in the art that various modifications in the arrangement, construction and form of the parts may be made without departing from the scope of the invention as defined by the appended claims.

What is claimed is:

1. In a vehicle spring, a plurality of plates of spring metal each overlapped by an adjacent plate, substantially semi-cylindrical pockets formed in the end portions of certain of said plates and extending completely across the same, said pockets being open toward the adjacent surface of the overlapping plate, and a bearing pad occupying each of said pockets and of sufficient thickness to hold apart the ends of the adjacent plates, said bearing pad being of sufficient length to overlap the sides of said plates and prevent transverse shifting of the pad in said pockets.

2. In a vehicle spring, a plurality of plates of spring metal each overlapped by an adjacent plate, substantially semi-cylindrical pockets formed in the end portions of certain of said plates and extending completely across the same, said pockets being open toward the adjacent surface of the overlapping plate, and a bearing pad occupying each of said pockets and of sufficient thickness to hold apart the ends of the adjacent plates, said bearing pad being formed with flanges engaging the sides of said plates at the pockets and preventing shifting of the pad axially of the pocket.

3. In a vehicle spring, a plurality of plates of spring metal each overlapped by an adjacent plate, substantially semi-cylindrical pockets formed in the end portions of certain of said plates and extending completely across the same, said pockets being open toward the adjacent surface of the overlapping plate, and a bearing pad occupying each of said pockets and of sufficient thickness to hold apart the ends of the adjacent plates, said bearing pad being formed of a supporting and lubricating material.

4. In a vehicle spring, a plurality of plates of spring metal each overlapped by an adjacent plate, semi-cylindrical pockets formed in the end portions and extending completely across certain of said plates and open toward the surface of the overlapping plate, a bearing pad of supporting and lubricating material in each of said pockets and of sufficient thickness and length to hold apart the ends of the adjacent plates, said bearing pads being of semi-cylindrical form and rockable in said pockets whereby the flat portion thereof is maintained parallel to the adjacent surface of the adjacent plate.

5. In a vehicle spring, a first plate of spring metal, a second plate of spring metal overlapped by said first plate, semi-cylindrical pockets formed in and extending completely across the end portions of said second plate and open toward the adjacent surface of said first plate, and a bearing pad occupying each of said pockets and of sufficient thickness as to hold apart the ends of the first and second plates and being formed of a load supporting and lubricating material.

HOWARD A. FLOGAUS.